United States Patent
Goto et al.

(10) Patent No.: US 7,850,355 B2
(45) Date of Patent: Dec. 14, 2010

(54) OPTICAL MEMBER, SURFACE LIGHT SOURCE UNIT, AND LIQUID CRYSTAL DISPLAY

(75) Inventors: Masahiro Goto, Mihara (JP); Daijiro Kodama, Mihara (JP)

(73) Assignee: Dai Nippon Printing Co., Ltd., Shinjuku-Ku (JP)

(*) Notice: Subject to any disclaimer, the term of this patent is extended or adjusted under 35 U.S.C. 154(b) by 300 days.

(21) Appl. No.: 12/043,983

(22) Filed: Mar. 7, 2008

(65) Prior Publication Data

US 2008/0225200 A1  Sep. 18, 2008

(30) Foreign Application Priority Data

Mar. 13, 2007  (JP)  ............................. 2007-062836
Apr. 17, 2007  (JP)  ............................. 2007-108023

(51) Int. Cl.
*F21V 7/04* (2006.01)
(52) U.S. Cl. ...................... 362/607; 362/97.1; 362/606; 362/615
(58) Field of Classification Search ....... 362/97.1–97.2, 362/97.4, 606–607, 615, 634; 349/114
See application file for complete search history.

(56) References Cited

U.S. PATENT DOCUMENTS

| 2002/0135996 | A1* | 9/2002 | Suga | 362/31 |
| 2005/0280756 | A1* | 12/2005 | Kim et al. | 349/114 |
| 2006/0158905 | A1* | 7/2006 | Lai et al. | 362/634 |

FOREIGN PATENT DOCUMENTS

JP  2007-047257 A1  2/2007

* cited by examiner

*Primary Examiner*—Sandra L O'Shea
*Assistant Examiner*—Meghan K Dunwiddie
(74) *Attorney, Agent, or Firm*—Burr & Brown

(57) ABSTRACT

An optical member that will be incorporated in a surface light source unit and that is scarcely deformed while it is used as a component of the surface light source unit. The optical member comprises optical sheets layered on each other. The optical sheets at least includes: an outermost optical sheet on the light-entrance side, which is situated outermost on the light-entrance side; and a high-rigidity optical sheet situated on the light-exit side of the outermost optical sheet on the light-entrance side, a rigidity of the high-rigidity optical sheet being higher than a rigidity of the outermost optical sheet on the light-entrance side.

29 Claims, 4 Drawing Sheets

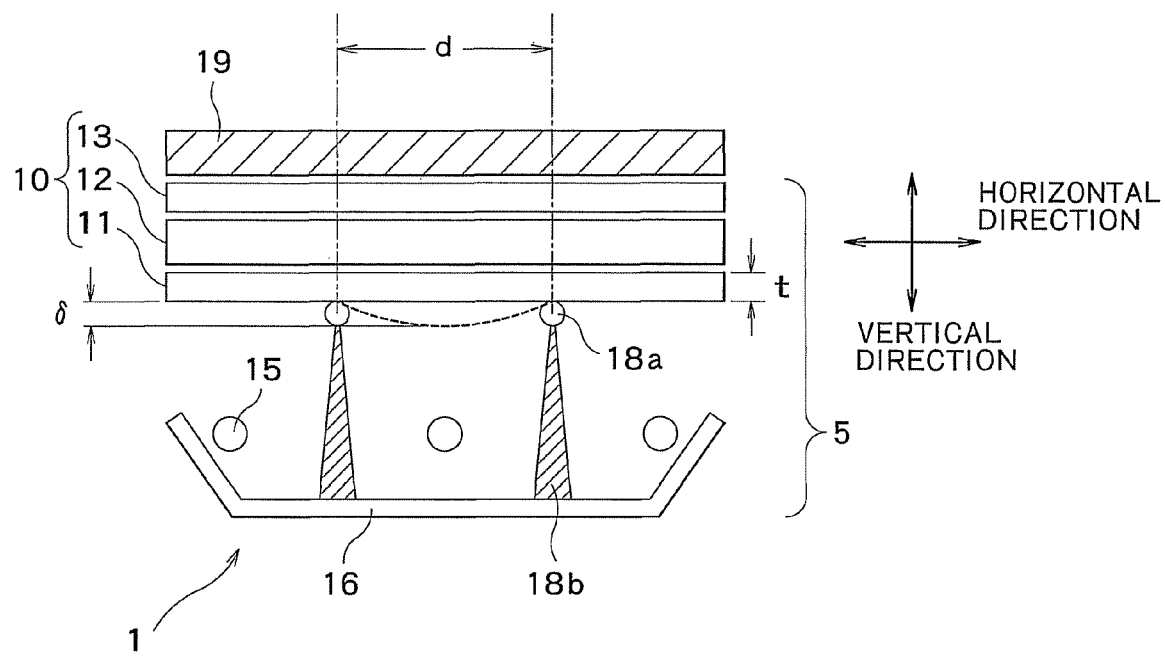
F I G. 4

OPTICAL MEMBER, SURFACE LIGHT SOURCE UNIT, AND LIQUID CRYSTAL DISPLAY

CROSS REFERENCE TO RELATED APPLICATIONS

This application is based upon and claims the benefit of priorities from the prior Japanese Patent Application No. 2007-062836 filed on Mar. 13, 2007 and the prior Japanese Patent Application No. 2007-108023 filed on Apr. 17, 2007, the entire contents of which are incorporated herein by reference.

BACKGROUND OF THE INVENTION

1. Field of the Invention

The present invention relates to an optical member, to a surface light source unit, and to a liquid crystal display. In particular, the present invention relates to an optical member including optical sheets layered on each other, to a surface light source unit including this optical member, and to a liquid crystal display including this surface light source unit.

2. Background Art

In recent years, liquid crystal displays using liquid crystal display panels (hereinafter also referred to as LCD panels) have been used in diverse fields as means of displaying images for use in personal computers, television sets, various information display terminals, and so forth. In such a liquid crystal display, the LCD panel is of transmission type. A surface light source unit converted light from a source to surface light (planate light) so as to illuminate the liquid crystal display panel from the backward side.

Surface light source units are roughly classified into two types, light-guide-plate type (including edge light type and side light type) and direct type. In a surface light source unit of light-guide-plate type, light sources such as cold cathode fluorescent lamps are arranged along the side edge of a flat light guide plate made from acrylic resin or the like excellent in light transmission properties. Light from the light sources travels in the light guide plate and lastly exits from the light guide plate. On the other hand, in a surface light source unit of direct type, no light guide plate is used, and light sources are placed in such positions that the light sources can face a liquid crystal display panel, with a plurality of optical sheets between the light sources and the liquid crystal display panel. Surface light source units of light-guide-plate type, with which decrease in power consumption and in the thickness of displays can be achieved, are mainly used for liquid crystal displays in small sizes of 20 inches or less. Surface light source units of direct type, on the other hand, are mainly used for large-sized liquid crystal displays.

FIG. 5 illustrates a conventional surface light source unit of direct type. A surface light source unit 40 shown in FIG. 5 comprises an optical member 20 capable of transmitting light, light sources 31 arranged on the light-entrance side of the optical member 20 so as to face the optical member 20, and a reflector 32 situated so as to face the optical member 20, with the light sources 31 between the reflector 32 and the optical member 20. The optical member 20 comprises a diffusing layer 21 made from styrene, acrylic resin, or the like, an adhesive layer 22, a light shielding layer 23 having openings, and a lens sheet 24, which are situated in the order named with the diffusing layer 21 in the outermost position on the light source 31 side. The above layers making up the optical member 20 are usually formed integrally. Such a surface light source unit 40 and an optical member 20 are also disclosed in Japanese Laid-Open Patent Publication No. 2007-47257.

Furthermore, an optical member 25 as shown in FIG. 6 has recently come to be used as well. The optical member 25 shown in FIG. 6 comprises a diffusing sheet 26, a brightness accentuating film BEF (trademark, Brightness Enhancement Film) 27 available from 3M Corporation, USA, and a polarized-light-splitting film DBEF (trademark, Double Brightness Enhancement Film) 28 available from 3M Corporation, which are laminated in the order named with the diffusing sheet 26 in the outermost position on the light source 31 side. Although these layers (the sheet and the films) are not stuck to each other, they are held in the state of being layered on each other.

In the optical sheet BEF 27, unit prisms that are triangular in sectional form and that are much larger in size as compared to wavelengths of light are regularly arranged on a base in sheet form. Such an optical sheet 27 can makes it possible to use light from light sources efficiently, since this optical sheet 27 can collimate off-axis light so as to redirect the light to the on-axis direction towards viewers or so as to recycle the light.

However, when incorporated in a liquid crystal display, such an optical member tends to be warped to be concave relative to the light source 31 side (light-entrance side) and convex relative to the liquid crystal display panel 19 side (light-exit side) while the light source are on. The optical member 25 thus presses the liquid crystal display panel 19 even to such an extent that a displayed image is adversely affected.

SUMMARY OF THE INVENTION

In the light of the above-described drawbacks in the prior art, the present invention was accomplished. An object of the present invention is therefore to provide an optical member that scarcely undergoes deformation while this optical member is used as a component of a surface light source unit. Another object of the present invention is to provide a surface light source unit comprising an optical member positioned in such a manner that this optical member faces a light source, and being capable of suppressing deformation of the optical member that occurs while the surface light source unit is used. In addition, a further object of the present invention is to provide a liquid crystal display comprising the surface light source unit.

A first optical member according to the present invention is an optical member for use in a surface light source unit, capable of transmitting light, comprising optical sheets layered on each other, wherein the optical sheets at least includes: an outermost optical sheet on the light-entrance side, which is situated outermost on the light-entrance side; and a high-rigidity optical sheet situated on the light-exit side of the outermost optical sheet on the light-entrance side, and wherein a rigidity of the high-rigidity optical sheet is higher than a rigidity of the outermost optical sheet on the light-entrance side.

In the first optical member according to the present invention, a rigidity of each of the optical sheets may be regarded as being higher when the value ($E \times t^3$) is greater, where E is a Young's modulus of each of the optical sheets and t is a thickness of each of the optical sheets.

Further, in the first optical member according to the present invention, the optical sheets may further include an outermost optical sheet on the light-exit side, which is situated outermost on the light-exit side and is different from the high-rigidity optical sheet, and the rigidity of the high-rigidity optical sheet may be higher than a rigidity of the outermost optical sheet on the light-exit side.

Furthermore, in the first optical member according to the present invention, at least one of the optical sheets may be an optical lens sheet having, on its light-exit-side surface, a lens array. In such a first optical member of the invention, the lens array may be made such that the lens array has unit lenses arranged regularly, and such that a percentage of a total of surface areas of curved portions of the unit lenses, a curvature radius of the curved portion being five times or more of a pitch with which the unit lenses are arranged, with respect to an area of the light-exit-side surface of the optical lens sheet is 50% or more. Moreover, in such a first optical member of the invention, a rigidity of the optical lens sheet may be higher than a rigidity of any other optical sheet included in the optical sheets.

Furthermore, in the first optical member according to the present invention, the high-rigidity optical sheet may have a lens array on its light-exit-side surface.

Furthermore, in the first optical member according to the present invention, the rigidity of the high-rigidity optical sheet may be higher than a rigidity of any other optical sheet included in the optical sheets.

Furthermore, in the first optical member according to the present invention, the high-rigidity optical sheet may be configured such that the high-rigidity optical sheet is not buckled by its own weight when the high-rigidity optical sheet is placed with its sheet plane substantially being in a vertical direction.

Furthermore, in the first optical member according to the present invention, the high-rigidity optical sheet may be made such that the high-rigidity optical sheet is rectangular in shape in a plane view, and a thickness t of the high-rigidity optical sheet, a length L of one side of the rectangle of the high-rigidity optical sheet, a Young's modulus E of the high-rigidity optical sheet, and a density ρ of the high-rigidity optical sheet fulfill the following relationship:

$$1 \leq E \times (t^2/\rho) \times L.$$

A first surface light source unit according to the present invention comprises one of the above-described first optical members of the invention, and a light source situated on the light-entrance side of the optical member.

The first surface light source unit according to the present invention may further comprises supports each having a contact that, from the light-entrance side, come into contact with the outermost optical sheet on the light-entrance side of the optical member, and the surface light source unit may be configured such that, when the surface light source unit is placed with a sheet plane of the outermost optical sheet on the light-entrance side substantially being in a horizontal direction, an amount of deflection in a vertical direction of the outermost optical sheet on the light-entrance side, determined at a point between two neighboring contacts, is smaller than a thickness of the outermost optical sheet on the light-entrance side, determined at the point between the two neighboring contacts.

Further, the first surface light source unit according to the present invention may further comprises supports each having a contact that, from the light-entrance side, come into contact with the outermost optical sheet on the light-entrance side of the optical member, and a distance d between two neighboring contacts, determined along the sheet plane of the outermost optical sheet on the light-entrance side, a density ρ of the outermost optical sheet on the light-entrance side, a thickness t of the outermost optical sheet on the light-entrance side, a Young's modulus E of the outermost optical sheet on the light-entrance side, and a gravitational acceleration g may fulfill the following relationship:

$$t > 15 \times \rho \times g \times d^4/(8 \times E \times t^2).$$

Furthermore, in the first surface light source unit according to the present invention, the contact of each of the supports may be transparent.

A first liquid crystal display according to the present invention comprises one of the above-described first surface light source units of the invention, and a liquid crystal display panel situated on the light-exit side of the optical member in the surface light source unit.

A second optical member according to the present invention is an optical member for use in a surface light source unit, capable of transmitting light, comprising optical sheets layered on each other, wherein the optical sheets include at least one optical lens sheet having, on its light-exit-side surface, a lens array, and wherein the optical lens sheet is configured such that the optical lens sheet is not buckled by its own weight when the optical lens sheet is placed with its sheet plane substantially being in a vertical direction.

In the second optical member according to the present invention, the optical lens sheet may be made so that the optical lens sheet is rectangular in shape in a plane view, and a thickness t of the optical lens sheet, a length L of one side of the rectangle of the optical lens sheet, a Young's modulus E of the optical lens sheet, and a density ρ of the optical lens sheet fulfill the following relationship:

$$1 \leq E \times (t^2/\rho) \times L.$$

Further, in the second optical member according to the invention, the lens array may be made so that the lens array has unit lenses arranged regularly, and a percentage of a total of surface areas of curved portions of the unit lenses, a curvature radius of the curved portion being five times or more of a pitch with which the unit lenses are arranged, with respect to an area of the light-exit-side surface of the optical lens sheet is 50% or more.

Furthermore, in the second optical member according to the present invention, a rigidity of the optical lens sheet may be higher than a rigidity of any other optical sheet included in the optical sheets.

Furthermore, in the second optical member according to the present invention, a rigidity of each of the optical sheets may be regarded as being higher when the value $(E \times t^3)$ is greater, where E is a Young's modulus of each of the optical sheets, and t is a thickness of each of the optical sheets.

A second surface light source unit according to the present invention comprises one of the above-described second optical members of the invention, and a light source situated on the light-entrance side of the optical member.

The second surface light source unit according to the present invention may further comprises supports each having a contact that, from the light-entrance side, come into contact with the outermost optical sheet on the light-entrance side of the optical member, and the surface light source unit may be configured such that, when the surface light source unit is placed with a sheet plane of the outermost optical sheet on the light-entrance side substantially being in a horizontal direction, an amount of deflection in a vertical direction of the outermost optical sheet on the light-entrance side, determined at a point between two neighboring contacts, is smaller than a thickness of the outermost optical sheet on the light-entrance side, determined at the point between the two neighboring contacts.

Further, the second surface light source unit according to the present invention may further comprises supports each having a contact that, from the light-entrance side, come into contact with the outermost optical sheet on the light-entrance side of the optical member, and a distance d between two neighboring contacts, determined along the sheet plane of the outermost optical sheet on the light-entrance side, a density ρ of the outermost optical sheet on the light-entrance side, a thickness t of the outermost optical sheet on the light-entrance side, a Young's modulus E of the outermost optical sheet on the light-entrance side, and a gravitational acceleration g may fulfill the following relationship:

$$t > 15 \times \rho \times g \times d^4 / (8 \times E \times t^2).$$

Furthermore, in the second surface light source unit according to the present invention, the contact of each of the supports may be transparent.

A second liquid crystal display according to the present invention comprises one of the above-described second surface light source units of the invention, and a liquid crystal display panel situated on the light-exit side of the optical member in the surface light source unit.

BRIEF DESCRIPTION OF THE DRAWINGS

FIG. 4 is a vertical sectional view of the liquid crystal display shown in FIG. 1, so placed that its display surface is in horizontal direction.

DETAILED DESCRIPTION OF THE INVENTION

An embodiment of the present invention will be described hereinafter with reference to the accompanying drawings. The scale, the ratio of length to width or the like of liquid crystal displays and of components thereof depicted in the accompanying drawings are exaggerated and different from that of the average real things for the sake of convenience and for the sake of facilitation of the understanding of them.

Figure 1:
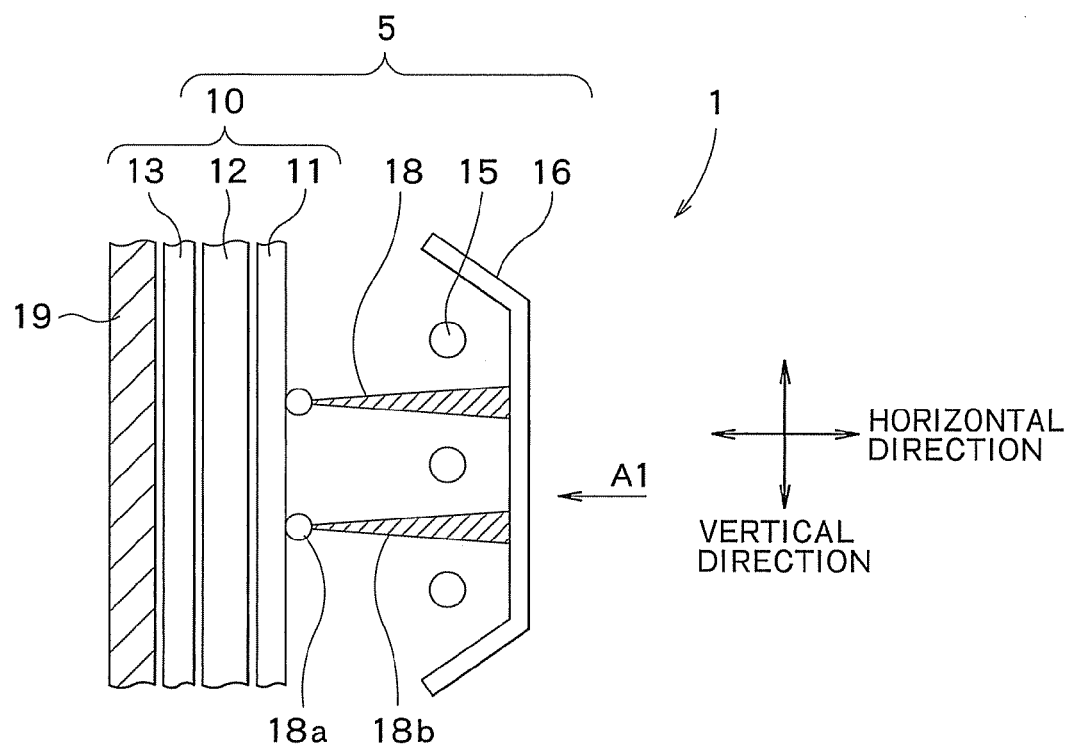
FIG. 1 illustrates an embodiment of the present invention and is a vertical sectional view schematically showing the structure of a liquid crystal display.
Figure 2:
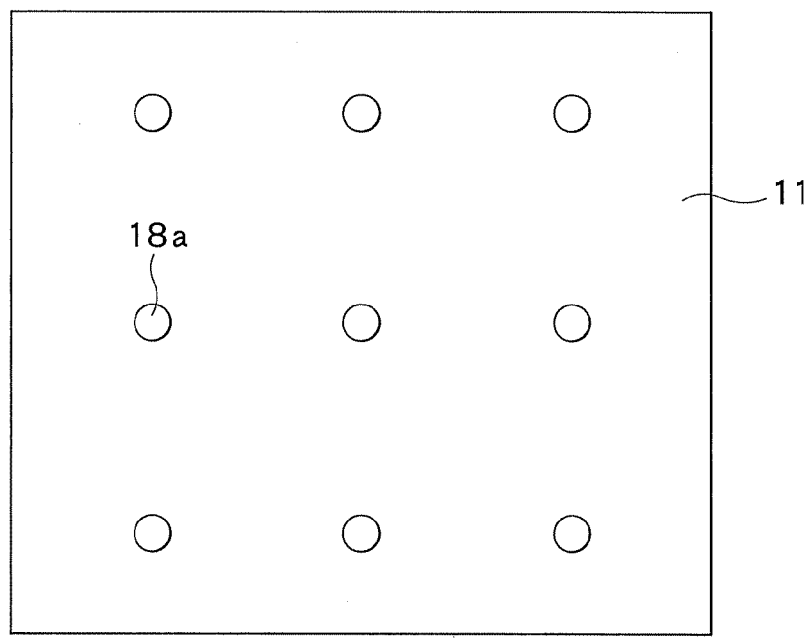
FIG. 2 is a view showing the arrangement of supports as viewed from direction A1 in FIG. 1.
Figure 3:
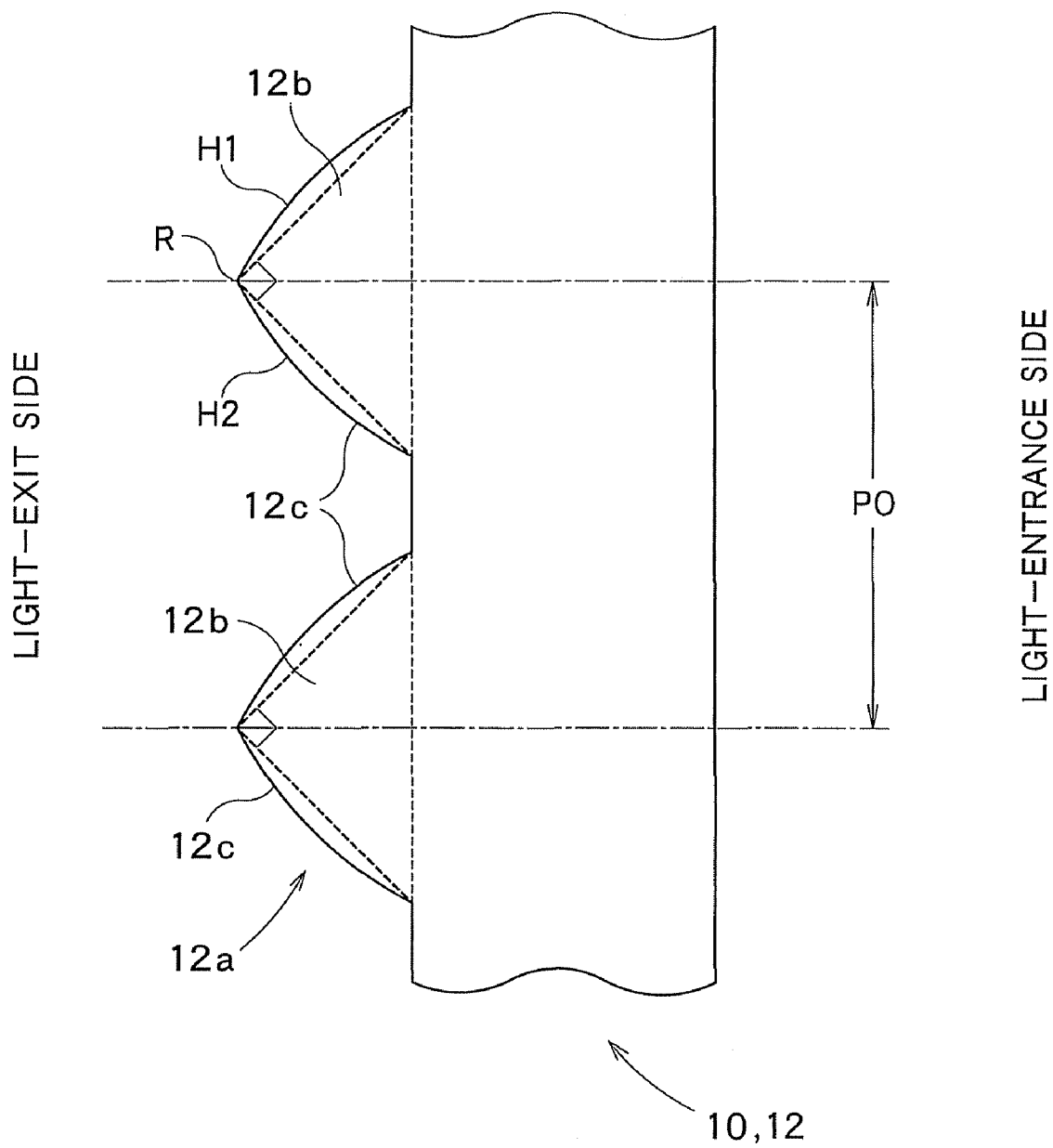
FIG. 3 is a cross-sectional view of a lens array formed on an optical sheet.
Figure 5:
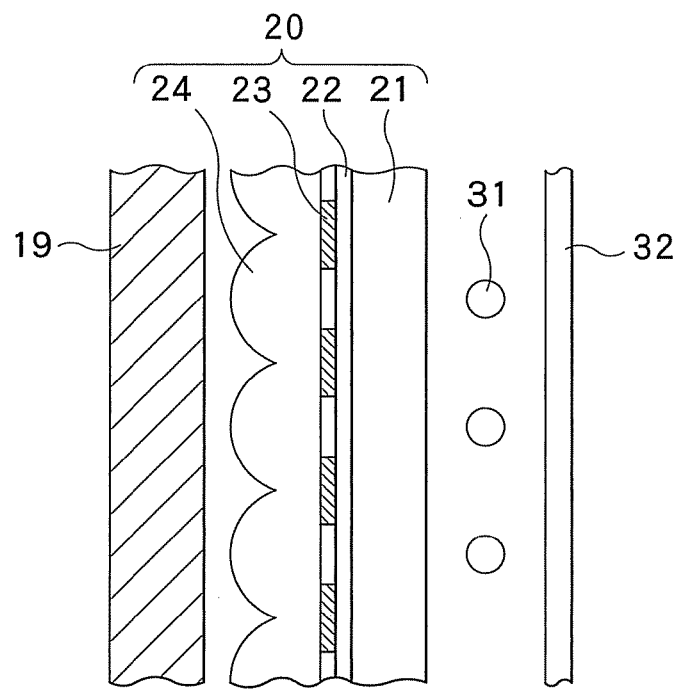
FIG. 5 is a vertical sectional view similar to that of FIG. 1 and illustrates a conventional surface light source unit and optical member.
Figure 6:
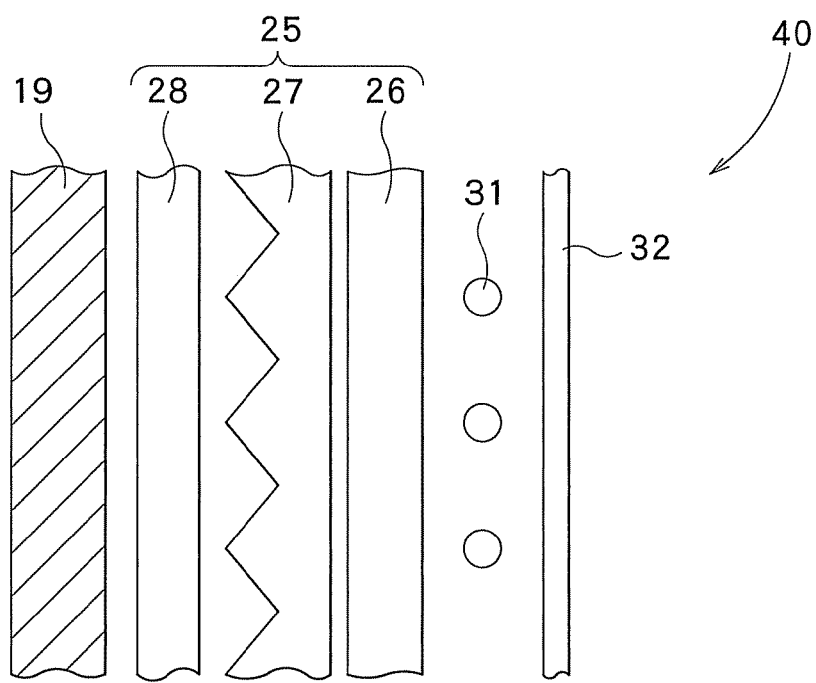
FIG. 6 is a vertical sectional view similar to that of FIG. 1 and illustrates another conventional surface light source unit and optical member.

FIGS. 1 to 4 are views for explaining one embodiment of a liquid crystal display, a surface light source unit, and an optical member according to the present invention. FIG. 1 is a vertical sectional view of a liquid crystal display, and FIG. 2 is a plane view for explaining the arrangement of supports. FIG. 3 is a cross-sectional view of part of an optical sheet incorporated in a liquid crystal display and is view for explaining the curvature radius of the curved portions of unit lenses of a lens array formed on the optical sheet, the arrangement of the unit lenses, and so forth. FIG. 4 is a vertical sectional view of the liquid crystal display shown in FIG. 1, being placed in a state different from that in FIG. 1.

In the drawings, reference numeral 1 denotes a liquid crystal display; 5 denotes a surface light source unit; 10 denotes an optical member; 11 to 13 denote optical sheets; 12a denotes a lens array; 12b denotes a unit lens of the lens array; 12c denotes a curved portion of the unit lens; 15 denotes a light source; 16 denotes a reflector; 18 denotes a support; 18a denotes a contact; 18b denotes a supporting part; 19 denotes a liquid crystal display panel; 20 denotes an optical member; 21 denotes an optical sheet (diffusing layer); 22 denotes an adhesive layer; 23 denotes a reflecting layer; 24 denotes an optical sheet (lens sheet); 25 denotes an optical member; 26 and 27 denote optical sheets; 31 denotes a light source; and 32 denotes a reflector.

The term "sheet" herein used is interchangeable with "film", "plate", etc. that may be distinguished from each other, for example, on the basis of thickness, and herein encompasses those members that can be called "films" or "plates".

As shown in FIG. 1, a liquid crystal display 1 comprises a liquid crystal display panel 19, and a surface light source unit 5 that is situated behind the liquid crystal display panel 19 so as to illuminate from the back side (so as to backlight) the liquid crystal display panel 19. The surface light source unit 5 for the liquid crystal display panel 19 comprises an optical member 10 situated behind the liquid crystal display panel 19, and a light source 15 situated on the back side of the optical member 10. In this embodiment, the light source 15 is composed of multiple linear cold cathode fluorescent lamps. In an example shown in FIG. 1, the multiple cold cathode fluorescent lamps constituting the light source 15 are so arranged that they extend horizontally in parallel with each other. Behind the light source 15 is situated a reflector 16. The reflector 16 may be composed of a reflective metallic plate, a substrate coated with a reflective metallic layer, or the like.

In this embodiment, the optical member 10 has three optical sheets 11, 12, 13. The three optical sheets 11, 12, 13, one optical sheet layered over another, make up the optical member 10 that is plane. Light from the light source 15 travels in the optical member 10 in the direction in which the three optical sheets 11, 12, 13 are layered, and illuminates the liquid crystal display panel 19. Therefore, the left-hand side in FIG. 1 is the light-exit (light-emergent side, light-outgoing side) side of the optical member 10, and the right-hand side, the light-entrance side (light-incident side) of the optical member 10.

The three optical sheets 11, 12, 13 in the state of being layered are fixed to one another at their edges. A fixture for fixing the optical sheets 11, 12, 13 to each other, however, is omitted from the figures in the accompanying drawings.

An plurality of optical sheets making up the optical member 10 include an outermost optical sheet 11 on the light-entrance side which is situated outermost on the light-entrance side, and a high-rigidity optical sheet 12 situated on the light-exit side of the outermost optical sheet 11 on the light-entrance side. A rigidity of the high-rigidity optical sheet is higher than a rigidity of the outermost optical sheet on the light-entrance side. The plurality of optical sheets making up the optical member 10 further include an outermost optical sheet 13 on the light-exit side which is situated on the light-exit side of the high-rigidity optical sheet 12. That is to say, the outermost optical sheet on the light-exit side is different from the high-rigidity optical sheet 12 and situated outermost on the light-exit side. The rigidity of the high-rigidity optical sheet 12 is higher than a rigidity of the outermost optical sheet 13 on the light-exit side. That is to say, the rigidity of the high-rigidity optical sheet 12 is higher than any other optical sheet included in the plurality of optical sheets making up the optical member 10.

The degree of rigidity of each optical sheet 11, 12, 13 can be determined by the use of the Young's modulus (also called modulus of rigidity) E and thickness t of the optical sheet. Specifically, the rigidity of each optical sheet can be regarded as being higher when the value ($E \times t^3$) of the optical sheet is greater and as being lower when this value (E×t³) of the optical sheet value is smaller. Therefore, the Young's modulus $E_1$ and thickness $t_1$ of the outermost optical sheet 11 on the light-entrance side and the Young's modulus $E_2$ and thickness $t_2$ of the high-rigidity optical sheet 12 fulfill the following relationship (1):

$$E_1 \times t_1^3 < E_2 \times t_2^3 \quad (1)$$

Similarly, the Young's modulus $E_2$ and thickness $t_2$ of the high-rigidity optical sheet 12 and the Young's modulus $E_3$ and thickness $t_3$ of the outermost optical sheet 13 on the light-exit side fulfill the following relationship (2):

$$E_2 \times t_2^3 < E_3 \times t_3^3 \quad (2)$$

The unit of the Young's modulus E may be [N/m²], and the unit of the thickness t may be [m].

In a conventional liquid display, an optical member tends to be warped so as to be concave relative to the light source side (light-entrance side) and convex relative to the liquid crystal display panel side (light-exit side), as mentioned previously. We made earnest studies on the mechanism of occurrence of this warping of an optical member and found the following.

Of a plurality of optical sheets making up an optical member, an outermost optical sheet situated outermost on the light source side (light-entrance side) becomes great in difference in percentage of moisture absorption (difference in dryness) between its two surfaces, but the rest of the plurality of optical sheets are free from or small in this difference. That is to say, the outermost optical sheet on the light-entrance side mainly undergoes deformation because the percentage of moisture absorption of its one surface becomes different from the percentage of moisture absorption of the other surface while a light source emits light, and the remaining optical sheets scarcely undergo deformation. Further, although the temperatures of the plurality of optical sheets increase due to heat released from the light source, no great difference in temperature is produced between two surfaces of each of the plurality of optical sheets. This means that the difference in temperature between two surfaces of each of the plurality of optical sheets is not a major cause of warping of the optical member.

It can be known from the above finding that a difference in percentage of moisture absorption is produced between two surfaces of the outermost optical sheet 11 on the light-entrance side while the optical member 10 is illuminated by the light source 15. The outermost optical sheet 11 on the light-entrance side is thus warped so as to be concave relative to the light-entrance side and convex relative to the light-exit side. When the outermost optical sheet 11 on the light-entrance side is so warped, the optical sheets 12, 13 situated on the light-exit side of this outermost optical sheet 11 on the light-entrance side are pressed either directly or indirectly by the outermost optical sheet 11 on the light-entrance side to become concave relative to the light-entrance side and convex relative to the light-exit side.

However, according to the optical member 10 in this embodiment, the high-rigidity optical sheet 12 is situated on the light-exit side of the outermost optical sheet 11 on the light-entrance side and the high-rigidity optical sheet 12 has higher rigidity than the outermost optical sheet 11 on the light-entrance side. That is to say, an optical sheet situated in the outermost position on the light-entrance side in the optical member 10 is most readily deformed while the optical member 10 is illuminated by the light source 15, and the optical sheet having highest rigidity is situated in a position other than the outermost position on the light-entrance side in the optical member 10. Therefore, the high-rigidity optical sheet 12 having higher rigidity than the outermost optical sheet 11 on the light-entrance side can withstand the pressure from the outermost optical sheet 11 on the light-entrance side, thereby significantly suppressing deformation of the optical member 10 that occurs at the light-exit side of the high-rigidity optical sheet 12. Moreover, the high-rigidity optical sheet 12 with the high rigidity can also suppress deformation of the outermost optical sheet 11 on the light-entrance side that is caused by the difference in percentage of moisture absorption between two surfaces of the outermost optical sheet 11 on the light-entrance side. The optical member 10 can thus be prevented from being deformed, as a whole, so as to be concave relative to the light-source side and convex relative to the liquid crystal display panel 19 side even when illuminated by the light source 15. It is also possible to prevent deterioration of a displayed image that is caused by deformation of the optical member 10.

Furthermore, according to the optical member 10 in this embodiment, the high-rigidity optical sheet 12 having higher rigidity than the outermost optical sheet 13 on the light-exit side is situated on the light-entrance side of the outermost optical sheet 13 on the light-exit side, as mentioned above. That is to say, the optical sheet having the highest rigidity is situated in a position other than the outermost position on the light-exit side in the optical member 10. Such formation of the optical member 10 can make the difference in percentage of moisture absorption between two surfaces of the optical sheet having the highest rigidity (the high-rigidity optical sheet 12 in this embodiment) smaller. It thus becomes possible to lessen remarkably deformation of the optical sheet having the highest rigidity that is caused by the difference in percentage of moisture absorption between two surfaces of this optical sheet.

An optical sheet is warped by its own weight when this optical sheet is placed with its sheet plane substantially being in a vertical direction. This warping of an optical sheet caused by its own weight increases abruptly when the weight of the optical sheet exceeds a certain threshold. This phenomenon is herein referred to as buckling. It is preferred that the high-rigidity optical sheet 12 that makes it possible to suppress deformation of the optical member 10 as a whole be configured such that the high-rigidity optical sheet 12 is not buckled by its own weight when the high-rigidity optical sheet 12 is placed with its sheet plane substantially being in the vertical direction. Specifically, if the intended shape of the high-rigidity optical sheet 12 is rectangular in a plane view and if the optical member 10 (the surface light source unit 5, the liquid crystal display 1) will be placed such that one side of the rectangle extends substantially in the vertical direction, it is proper to design the high-rigidity optical sheet 12 (the optical member 10, the surface light source unit 5, the liquid crystal display 1) such that the thickness t of the high-rigidity optical sheet 12, the length L of one vertical side of the rectangle of the high-rigidity optical sheet 12, the Young's modulus E of the high-rigidity optical sheet 12, and the density ρ of the high-rigidity optical sheet 12 fulfill the following relationship (3):

$$1 \leq E \times (t^2/\rho) \times L \quad (3).$$

If the above relationship (3) is fulfilled, the high-rigidity optical sheet 12 is not buckled by its own weight when the high-rigidity optical sheet 12 is held in such a state that its sheet plane is in the vertical direction.

The unit of the thickness t may be [m], the unit of the length L may be [m], the unit of the Young's modulus E may be [N/m²], and the unit of the density ρ may be [kg/m³]. The term "sheet plane" herein used refers to a plane which extends along a plane containing an intended member in sheet form when the intended member is observed wholly in perspective. In this embodiment, the sheet planes of the optical sheets 11, 12, 13, the sheet plane of the optical member 10 as a whole, and the display surface of the liquid crystal display 1 are parallel to each other.

The optical member 10 to be incorporated in the surface light source unit 5 for use in the liquid crystal display 1 has the function of making the two-dimensional distribution in a sheet plane (within-surface distribution), of light from the light source 15, uniform, as well as the function of concentrating (collimating) the light so that the light travels in a frontal direction, which is the direction of the normal to the optical member 10. The optical member 10, 20, 25 usually contains an optical lens sheet 12, 24, 27 having, on its light-exit-side surface, a lens array 12a. Such an optical lens sheet 12, 24, 27 can control the directivity (directional characteristic) of light by means of the optical actions (specifically, refraction, reflection, etc.) of the lens array 12a. That is to say, the optical lens sheet 12, 24, 27 can concentrates (collimates) light passing through the optical member 10, 20, 25 so that the light travels substantially along the frontal direction (the direction of the normal to the sheet plane of the optical lens sheet 12). It is thus possible to increase the amount of light that can be effectively used by the liquid crystal display panel 19, thereby improving optical efficiency of light from the light source 15. The word "lens" herein used encompasses not only lenses in a narrow sense, but also so-called prisms.

On the other hand, if the optical lens sheet 12 having the lens array 12a is deformed (warped, bent), not only the lens array 12a on the optical lens sheet 12 does not act as is expected, but also an image displayed on the liquid crystal display 1 undergoes deterioration in quality. For example, the deformed optical lens sheet 12 cannot direct, to the frontal side, light from the light source 15, so that the liquid crystal display 1 displays an image only darkly. In order to avoid such trouble, it is preferred that the optical lens sheet having the lens array 12a be not easy to deform.

It is therefore preferred that the optical lens sheet be configured such that the optical lens sheet is not buckled by its own weight when the optical lens sheet is placed with its sheet plane substantially being in the vertical direction. Specifically, if the intended shape of the optical lens sheet is rectangular in a plane view and if the optical member 10 (the surface light source unit 5, the liquid crystal display 1) will be placed such that one side of the rectangle extends substantially in the vertical direction, it is proper to design the optical lens sheet such that the thickness t of the optical lens sheet, the length L of one vertical side of the rectangle of the optical lens sheet, the Young's modulus E of the optical lens sheet, and the density ρ of the optical lens sheet fulfill the above relationship (3). When the above relationship (3) is fulfilled, it is possible to avoid buckling of the optical lens sheet 12 held in such a state that its sheet plane is in the vertical direction.

In this embodiment, the lens array 12a is formed on the light-exit-side surface of the high-rigidity optical sheet 12, as shown in FIG. 3. Therefore, the optical lens sheet (high-rigidity optical sheet) 12 having the lens array 12a is not buckled by its own weight when the optical lens sheet (high-rigidity optical sheet) 12 is placed so that its sheet plane is substantially along the vertical direction. Further, the optical lens sheet (high-rigidity optical sheet) 12 having the lens array 12a has higher rigidity than any other optical sheet included in the plurality of optical sheets making up the optical member 10. For this reason, according to the optical member 10 (the surface light source unit 5, the liquid crystal display 1) of this embodiment, the optical lens sheet 12 having the lens array 12a is not greatly deformed (is not buckled), or rather, the optical lens sheet 12 is not easy to deform. The intended effects of the lens array 12a can thus be obtained, and the liquid crystal display 1 can display a good-quality image on the display surface.

The level of the rigidity of each optical sheet herein mentioned can be assessed by the use of the Young's modulus E and thickness t of the optical sheet, as in the above-described method of assessment. Specifically, the rigidity of each optical sheet can be regarded as being higher when the value ($E \times t^3$) of the optical sheet is greater and as being lower when this value ($E \times t^3$) of the optical sheet is smaller. In calculating the value ($E \times t^3$) of the optical sheet having the lens array 12a, the height of the unit lens 12b of the lens array 12a formed on the base can be neglected, and the thickness of the base of the optical lens sheet 12 can be taken as the thickness t of the optical lens sheet 12.

In this embodiment, the lens array 12a formed on the light-exit-side surface of the high-rigidity optical sheet 12 has multiple unit lenses 12b regularly arranged over nearly the whole area of the light-exit-side surface of the high-rigidity optical sheet 12, as shown in FIG. 3. More particularly, the multiple unit lenses 12b are arranged in two different directions (typically in two directions crossing at right angles) with a fixed pitch (e.g., with the pitch P0 in either direction) to make up the lens array 12a that is a flys' eye lens. FIG. 3 is a cross-sectional view of the optical lens sheet (high-rigidity optical sheet) 12 taken along the normal to the sheet plane of the optical lens sheet (high-rigidity optical sheet) 12 and along the direction in which the unit lenses 12a are arranged. This cross section will be hereinafter referred to as a main section.

In the main section of the optical lens sheet 12, the unit lens 12b shown in FIG. 3 has an outline having two curves (H1 and H2) bulging from two sides of an isosceles right triangle (indicated by dotted lines in FIG. 3) containing the vertical angle R, the two sides being positioned on both sides of the vertical angle R. That is to say, the unit lens 12b has curved portions 12c that form its light-exit-side surface. For example, a film RBEF (trademark, Rounded Brightness Enhancement Film) available from Sumitomo 3M Limited, Japan can be used as the optical lens sheet 12 having such unit lenses 12b. If the surfaces of the unit lenses 12b are not curved but flat, the image quality greatly deteriorates as the optical lens sheet 12 deforms. On the other hand, when the unit lenses 12b have curved portions 12c as in this embodiment, they make it possible to suppress remarkably deterioration of image quality that occurs with the deformation of the optical lens sheet 12.

However, as the curvature radius of the curved portion 12c of the unit lens 12b in the main section of the optical lens sheet 12 increases, the unit lens 12b comes to exert an action on transmitted light, different from the action of an unit lens that is isosceles triangular in shape in the main section. As a result of our earnest studies, we found the following; as long as the curvature radius of the outline of the curved portion 12c in the main section of the optical lens sheet 12 is five times or more of the pitch P0 with which the unit lenses 12b are arranged, the unit lenses 12b having the curved portions 12c exert, on transmitted light, nearly the same collimating action (concentrating action) as that of unit lenses that are isosceles triangular in the main section of the unit lenses.

Furthermore, in this embodiment, the percentage of the total of the surface areas of the curved portions 12c of the unit lenses 12b, the curvature radius of the curved portion 12c being five times or more of the pitch P0 with which the unit lenses 12*b* are arranged, with respect to the area of the light-exit-side surface of the optical lens sheet 12 is 50% or more. Such an optical lens sheet 12 can effectively prevent deterioration of image quality as long as the optical lens sheet 12 is so formed that the optical lens sheet 12 is not buckled (e.g., the optical lens sheet 12 is so formed that the above relationship (3) is fulfilled), as mentioned previously.

In this embodiment, the surface light source unit 5 further comprises supports 18 that, from the light-entrance side, come into contact with the outermost optical sheet 11 on the light-entrance side of the optical member 10 so as to keep the optical member 10 flat. Each support 18 has a contact 18*a* that comes into contact with the outermost optical sheet 11 on the light-entrance side, and a supporting part 18*b* that supports the contact 18*a*.

In a cross section taken along the normal to the optical member 20 (see FIG. 1), the contacts 18*a* have circular outlines. These contacts 18*a* are transparent, so that the supports 18 scarcely intercept light from the light source 15. Further, the supporting parts 18*b* are fixed to a reflector 16. In assembling a liquid crystal display 1, the surface light source unit 5 (more particularly, the reflector 16) is mounted in a frame or the like set on the light-exit side of the liquid crystal display panel 19. In this process, the supports 18 come into contact with the optical member 10 from the light-entrance side so as to press the optical member 10 against the frame or the like. The optical member 10 composed of the plurality of optical sheets 11, 12, 13, made by layering one optical sheet over another, can thus be kept in an extended flat state.

The multiple supports 18 are arranged in various positions along a horizontal line and a vertical line so that the contacts 18*a* come into contact with nearly the whole area of the surface of the outermost optical sheet 11 on the light-entrance side, as shown in FIG. 2. In this embodiment, in a plane view of the optical member 10, i.e., when the optical member 10 is viewed along the direction of the normal to the optical member 10, indicated by arrow A1 in FIG. 1, the contacts 18*a* are regularly arranged on the outermost optical sheet 11 on the light-entrance side, as shown in FIG. 2. More particularly, the contacts 18*a* are arranged on the outermost optical sheet 11 on the light-entrance side in two different directions (typically in two directions crossing at right angles) at fixed intervals.

There is also a case where the liquid crystal display 1 is placed with the sheet planes of the plurality of optical sheets 11, 12, 13 making up the optical member 20 substantially being in a horizontal direction, as shown in FIG. 4. When such a case is taken into account, it is preferred that, when the surface light source unit 5 is placed with the sheet plane of the outermost optical sheet 11 on the light-entrance side substantially being in the horizontal direction, the amount of deflection (flexible volume) δ in the vertical direction of the outermost optical sheet 11 on the light-entrance side, determined at a point between two neighboring contacts 18*a*, be smaller than the thickness of the outermost optical sheet 11 on the light-entrance side determined at this point between the two contacts 18. Specifically, it is proper to design the surface light source unit 5 (liquid crystal display 1) such that the distance d between two neighboring contacts 18*a*, determined along the sheet plane of the outermost optical sheet 11 on the light-entrance side (see FIG. 4), the density ρ of the outermost optical sheet 11 on the light-entrance side, the thickness t of the outermost optical sheet 11 on the light-entrance side, the Young's modulus E of the outermost optical sheet 11, and the gravitational acceleration g fulfill the following relationship (4):

$$t > 15 \times \rho \times g \times d^4 / (8 \times E \times t^2) \quad (4).$$

The value of the right side of the above relationship (4) is equivalent to the amount of deflection of a beam having the thickness t and the length d when the beam is deformed by its own weight (under uniformly distributed load), provided that the beam is so supported at both hinged ends that it can revolve. Practically, since the contacts 18*a* cannot support the outermost optical sheet 11 on the light-entrance side so that the optical sheet 11 on the light-entrance side can revolve perfectly, the outermost optical sheet 11 on the light-entrance side is bent in an amount smaller than the value of the right side of the relationship (4). Further, in designing the surface light source unit 5 by the use of the relationship (4), it is desirable to take, as the distance d, the maximum distance between neighboring two of the multiple contacts 18*a* arranged regularly. In this case, the amount of bending (flexible volume) 6 of the outermost optical sheet 11 on the light-entrance side can be made smaller than the thickness t of the outermost optical sheet 11 on the light-entrance side with higher certainty.

The unit of the distance d may be [m], the unit of the density ρ may be [kg/m$^3$], the thickness t may be [m], the unit of the Young's modulus E may be [N/m$^2$], and the unit of the gravitational acceleration g may be [m/sec$^2$].

According to the liquid crystal display 1 so designed that the relationship (4) is fulfilled, an image displayed on the display 1 does not undergo significant deterioration even when the display 1 is placed such that the display surface is nearly along the horizontal direction. That is to say, warping of the optical member 10 can be suppressed to a practically permissible level.

The plurality of optical sheets 11, 12, 13 making up the optical member 10 can be made from a variety of materials. For example, films (sheets) of resins such as styrene, acrylic, and polycarbonate resins can be used for the outermost optical sheet 11 on the light-entrance side and the outermost optical sheet 13 on the light-exit side.

The high-rigidity optical sheet 12 having the lens array 12 can be formed by extrusion molding, injection molding, or heat press molding, which are well known to those skilled in the art, using PET (polyethylene terephthalate), PC (polycarbonate), PMMA (polymethylmethacrylate), COP (cycloolefin polymer) or the like. Alternatively, the high-rigidity optical sheet 12 can also be formed by ultraviolet-light-curing molding in which an ultraviolet-curing resin is applied to a base made from PET (polyethylene terephthalate), PP (polypropylene), PC (polycarbonate), PMMA (polymethylmethacrylate), PE (polyethylene), or the like. It is, of course, possible to use the above-described film BEF (trademark) or the like as the high-rigidity optical sheet 12.

It should be understood that the aforementioned embodiment be susceptible to various modifications without departing from the scope of the invention. Some such modifications will be described below.

For example, in the above-described embodiment, the optical member 10 is composed of the three optical sheets 11, 12, 13. The present invention is not limited to this. The optical member 10 may be composed of two optical sheets, or of four or more optical sheets.

Further, in the aforementioned embodiment, the high-rigidity optical sheet 12 has the lens array 12*a*. The present invention is not limited to this. The lens array 12*a* may be formed on any optical sheet other than the high-rigidity optical sheet 12. For example, the lens array 12*a* may be formed on the outermost optical sheet 13 on the light-exit side. It is however preferred that the optical lens sheet having the lens array 12*a* be so formed that it fulfills the above relationship (3). It is also preferred that the optical lens sheet having the lens array 12a be situated in a position other than the outermost position on the light-entrance side, an optical sheet situated in this outermost position being most easily deformed.

Furthermore, in the aforementioned embodiment, the lens array 12a is formed only on one of the plurality of optical sheets 11, 12, 13 making up the optical member 10. The present invention is not limited to this. For example, the lens array 12a may be formed on two or more of the multiple optical sheets.

Furthermore, in the above-described embodiment, the unit lenses 12b of the lens array 12a are arranged in two different directions at fixed intervals. The present invention is not limited to this. For example, there can be used a lens array composed of unit lenses arranged in a direction (arrangement direction), each of the unit lenses extending linearly along a direction perpendicular to the arrangement direction of the unit.

Furthermore, in the aforementioned embodiment, the plurality of optical sheets 11, 12, 13 making up the optical member 10 are not fixed to each other at their surfaces. The present invention is not limited to this. The optical sheets 11, 12, 13 may be fixed to each other with an adhesive layer, for example.

Furthermore, in the aforementioned embodiment, the light source 15 is composed of linear cold cathode fluorescent lamps. The present invention is not limited to this. A variety of known light sources, such as light sources using light-emitting diodes and point light sources, can also be used.

Some modifications of the aforementioned embodiment have been described above. It is of course possible to use a proper combination of two or more modifications.

What is claimed is:

1. An optical member for use in a surface light source unit, capable of transmitting light, comprising optical sheets layered on each other,
    wherein the optical sheets at least includes: an outermost optical sheet on the light-entrance side, which is situated outermost on the light-entrance side; and a high-rigidity optical sheet situated on the light-exit side of the outermost optical sheet on the light-entrance side,
    wherein a rigidity of the high-rigidity optical sheet is higher than a rigidity of the outermost optical sheet on the light-entrance side
    wherein a rigidity of each of the optical sheets is regarded as being higher when the value ($E \times t^3$) is greater, where E is a Young's modulus of each of the optical sheets and t is a thickness of each of the optical sheets.

2. The optical member according to claim 1,
    wherein the high-rigidity optical sheet has a lens array on its light-exit-side surface.

3. The optical member according to claim 2,
    wherein the rigidity of the high-rigidity optical sheet is higher than a rigidity of any other optical sheet included in the optical sheets.

4. The optical member according to claim 1,
    wherein the high-rigidity optical sheet is configured such that the high-rigidity optical sheet is not buckled by its own weight when the high-rigidity optical sheet is placed with its sheet plane substantially being in a vertical direction.

5. The optical member according to claim 1,
    wherein the high-rigidity optical sheet is rectangular in shape in a plane view, and
    wherein a thickness t of the high-rigidity optical sheet, a length L of one side of the rectangle of the high-rigidity optical sheet, a Young's modulus E of the high-rigidity optical sheet, and a density ρ of the high-rigidity optical sheet fulfill the following relationship:

$1 \leq E \times (t^2/\rho) \times L$.

6. A surface light source unit comprising:
    an optical member according to claim 1; and
    a light source situated on the light-entrance side of the optical member.

7. The surface light source unit according to claim 6, further comprising supports each having a contact that, from the light-entrance side, come into contact with the outermost optical sheet on the light-entrance side of the optical member,
    wherein a distance d between two neighboring contacts, determined along the sheet plane of the outermost optical sheet on the light-entrance side, a density ρ of the outermost optical sheet on the light-entrance side, a thickness t of the outermost optical sheet on the light-entrance side, a Young's modulus E of the outermost optical sheet on the light-entrance side, and a gravitational acceleration g fulfill the following relationship:

$t > 15 \times \rho \times g \times d^4 / (8 \times E \times t^2)$.

8. The surface light source unit according to claim 7,
    wherein the contact of each of the supports is transparent.

9. A liquid crystal display comprising:
    a surface light source unit according to claim 6; and
    a liquid crystal display panel situated on the light-exit side of the optical member of the surface light source unit.

10. An optical member for use in a surface light source unit, capable of transmitting light, comprising optical sheets layered on each other,
    wherein the optical sheets include at least one optical lens sheet having, on its light-exit-side surface, a lens array, and
    wherein the optical lens sheet is configured such that the optical lens sheet is not buckled by its own weight when the optical lens sheet is placed with its sheet plane substantially being in a vertical direction.

11. The optical member according to claim 10,
    wherein the optical lens sheet is rectangular in shape in a plane view, and
    wherein a thickness t of the optical lens sheet, a length L of one side of the rectangle of the optical lens sheet, a Young's modulus E of the optical lens sheet, and a density ρ of the optical lens sheet fulfill the following relationship:

$1 \leq E \times (t^2/\rho) \times L$.

12. The optical member according to claim 10,
    wherein the lens array has unit lenses arranged regularly, and
    wherein a percentage of a total of surface areas of curved portions of the unit lenses, a curvature radius of the curved portion being five times or more of a pitch with which the unit lenses are arranged, with respect to an area of the light-exit-side surface of the optical lens sheet is 50% or more.

13. The optical member according to claim 10,
    wherein a rigidity of the optical lens sheet is higher than a rigidity of any other optical sheet included in the optical sheets.

14. The optical member according to claim 13,
    wherein a rigidity of each of the optical sheets is regarded as being higher when the value ($E \times t^3$) is greater, where E is a Young's modulus of each of the optical sheets, and t is a thickness of each of the optical sheets.

15. A surface light source unit comprising:
an optical member according to claim 10; and
a light source situated on the light-entrance side of the optical member.

16. The surface light source unit according to claim 15, further comprising supports each having a contact that, from the light-entrance side, come into contact with the outermost optical sheet on the light-entrance side of the optical member,
wherein a distance d between two neighboring contacts, determined along the sheet plane of the outermost optical sheet on the light-entrance side, a density $\rho$ of the outermost optical sheet on the light-entrance side, a thickness t of the outermost optical sheet on the light-entrance side, a Young's modulus E of the outermost optical sheet on the light-entrance side, and a gravitational acceleration g fulfill the following relationship:

$$t > 15 \times \rho \times g \times d^4/(8 \times E \times t^2).$$

17. The surface light source unit according to claim 16, wherein the contact of each of the supports is transparent.

18. A liquid crystal display comprising:
a surface light source unit according to claim 15; and
a liquid crystal display panel situated on the light-exit side of the optical member of the surface light source unit.

19. An optical member for use in a surface light source unit, capable of transmitting light, comprising optical sheets layered on each other,
wherein the optical sheets at least includes:
an outermost optical sheet on the light-entrance side, which is situated outermost on the light-entrance side; and a high-rigidity optical sheet situated on the light-exit side of the outermost optical sheet on the light-entrance side,
wherein a rigidity of the high-rigidity optical sheet is higher than a rigidity of the outermost optical sheet on the light-entrance side, and
wherein the high-rigidity optical sheet has a lens array on its light-exit-side surface.

20. The optical member according to claim 19,
wherein the rigidity of the high-rigidity optical sheet is higher than a rigidity of any other optical sheet included in the optical sheets.

21. The optical member according to claim 19,
wherein the high-rigidity optical sheet is configured such that the high-rigidity optical sheet is not buckled by its own weight when the high rigidity optical sheet is placed with its sheet plane substantially being in a vertical direction.

22. The optical member according to claim 19,
wherein the high-rigidity optical sheet is rectangular in shape in a plane view, and
wherein a thickness t of the high-rigidity optical sheet, a length L of one side of the rectangle of the high-rigidity optical sheet, a Young's modulus E of the high-rigidity optical sheet, and a density $\rho$ of the high-rigidity optical sheet fulfill the following relationship:

$$1 \leq E \times (t^2/\rho) \times L.$$

23. A surface light source unit comprising:
an optical member according to claim 19, and a light source situated on the light-entrance side of the optical member.

24. The surface light source unit according to claim 23, further comprising supports each having a contact that, from the light-entrance side, come into contact with the outermost optical sheet on the light-entrance side of the optical member,
wherein a distance d between two neighboring contacts, determined along the sheet plane of the outermost optical sheet on the light-entrance side, a density $\rho$ of the outermost optical sheet on the light-entrance side, a thickness t of the outermost optical sheet on the light-entrance side, a Young's modulus E of the outermost optical sheet on the light-entrance side, and a gravitational acceleration g fulfill the following relationship:

$$t > 15 \times \rho \times g \times d^4/(8 \times E \times t^2).$$

25. The surface light source unit according to claim 23, wherein the contact of each of the supports is transparent.

26. A liquid crystal display comprising:
a surface light source unit according to claim 23, and a liquid crystal display panel situated on the light-exit side of the optical member of the surface light source unit.

27. The surface light source unit according to claim 23, wherein the contact of each of the supports is transparent.

28. A liquid crystal display comprising:
a surface light source unit according to claim 23; and
a liquid crystal display panel situated on the light-exit side of the optical member of the surface light source unit.

29. A surface light source unit comprising:
an optical member for use in a surface light source unit, capable of transmitting light, including optical sheets layered on each other;
a light source situated on the light entrance side of the optical member; and
supports each having a contact that, from the light-entrance side, come into contact with the outermost optical sheet on the light-entrance side of the optical member,
wherein a distance d between two neighboring contacts, determined along the sheet plane of the outermost optical sheet on the light-entrance side, a density $\rho$ of the outermost optical sheet on the light-entrance side, a thickness t of the outermost optical sheet on the light-entrance side, a Young's modulus E of the outermost optical sheet on the light-entrance side, and a gravitational acceleration g fulfill the following relationship:

$$t > 15 \times \rho \times g \times d^4/(8 \times E \times t^2).$$

\* \* \* \* \*